Jan. 14, 1930.　　　T. R. HARRISON　　　1,743,854
RECORDING METER
Filed Aug. 16, 1926　　　2 Sheets-Sheet 1
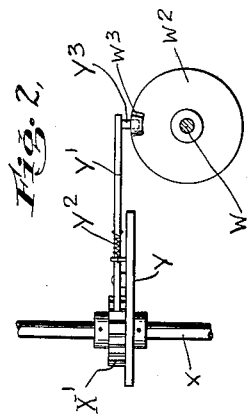
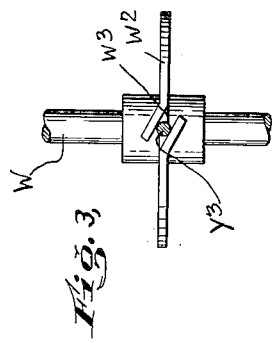
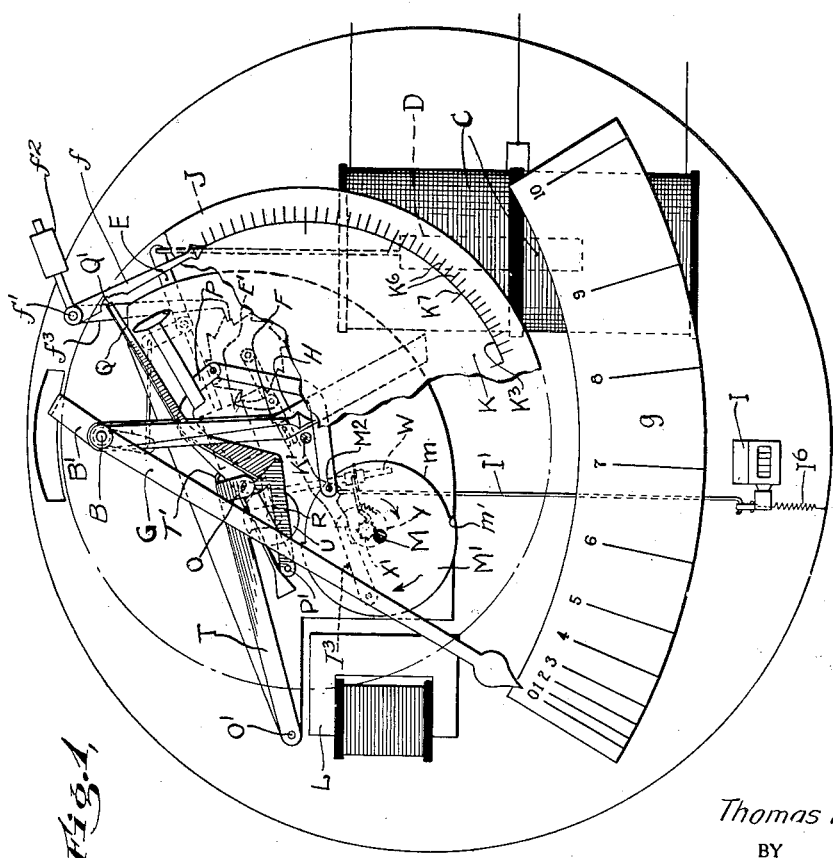
INVENTOR
Thomas R. Harrison
BY
John E. Hubbell
ATTORNEY Jan. 14, 1930. T. R. HARRISON 1,743,854
RECORDING METER
Filed Aug. 16, 1926 2 Sheets-Sheet 2
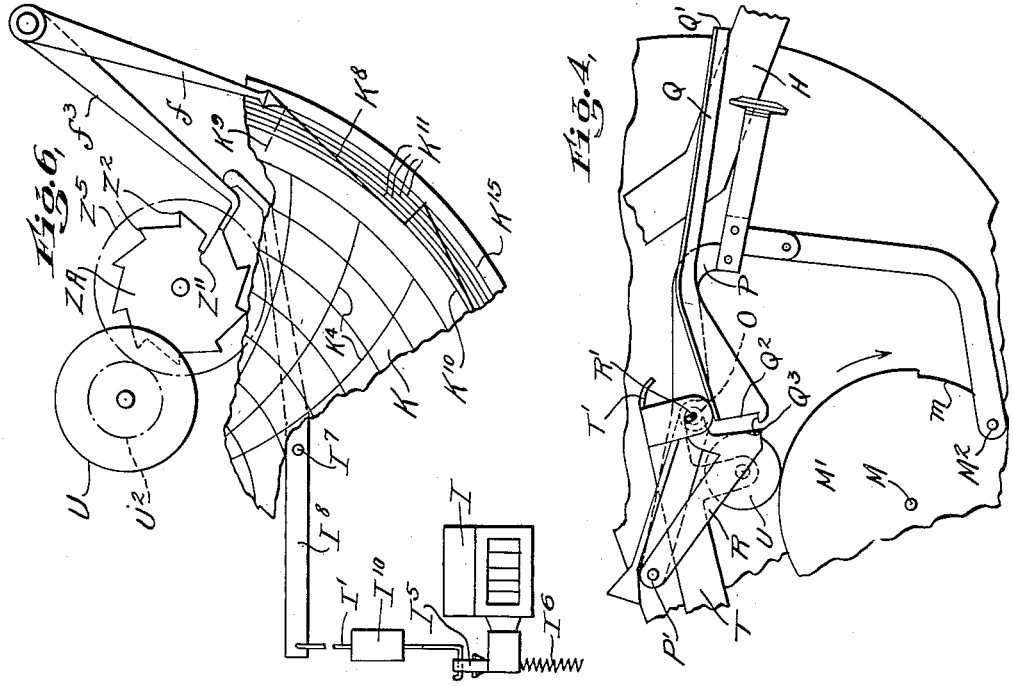
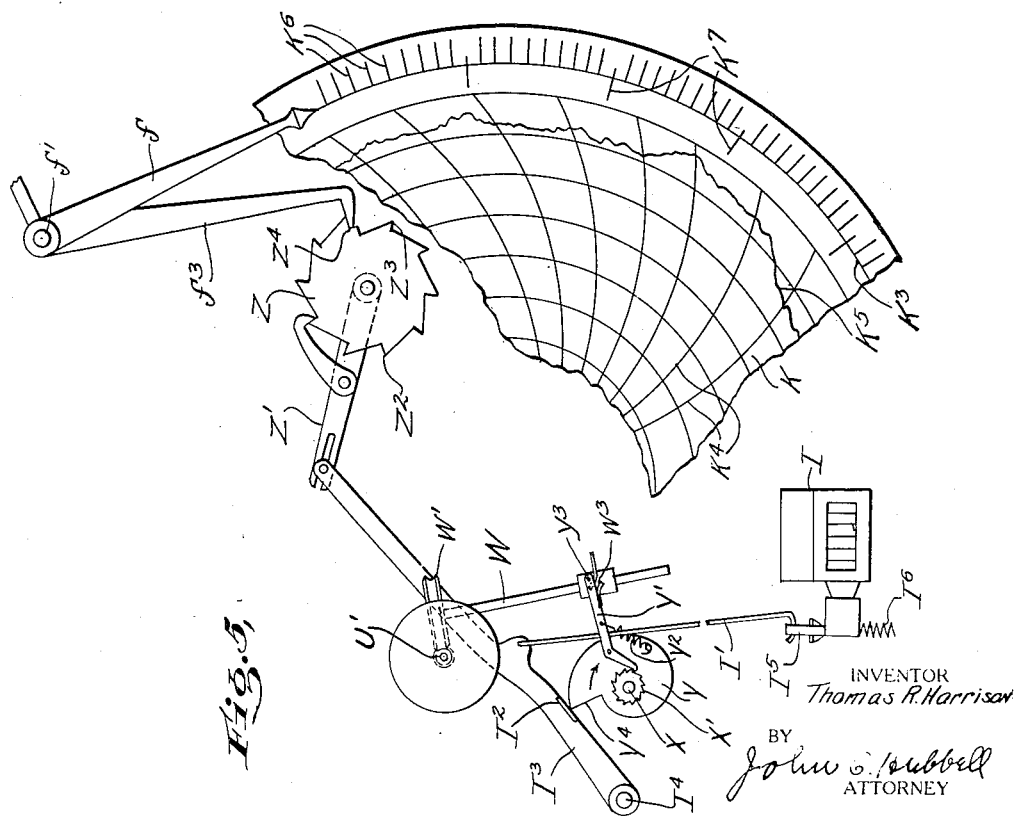
INVENTOR
Thomas R. Harrison
BY
John E. Hubbell
ATTORNEY Patented Jan. 14, 1930

1,743,854

UNITED STATES PATENT OFFICE

THOMAS R. HARRISON, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA

RECORDING METER

Application filed August 16, 1926. Serial No. 129,643.

The general object of the present invention is to provide a recording meter, which may be of any usual or suitable type, for making a record of the instantaneous values of a quantity being measured, with simple and effective means for making a record on the same record surface on which said continuous record is formed of progressive increases in the integrated value of the quantity measured occurring during all, or any portion, of the time period covered by the continuous record.

In a preferred practical mode of carrying out the invention I employ a combined recording and integrating mechanism in which the instantaneous value recording arm of the meter, and an integrating control element are simultaneously given corresponding movements on changes in value of the quantity measured, and combine therewith means actuated by the integrating mechanism for recording progressive increases in the integrated value of the quantity measured. In preferred practice also, both the continuous record of the instantaneous value of the quantity and the record of the changes in the integrated value of the quantity are made upon a chart in the form of a rotating disc, travelling record strip, or the like, provided with the usual time indicating lines, and in such relation to said lines that the change in the integrated value occurring between any two points on the instantaneous value curve can be determined or closely approximated from inspection of the record chart.

The various features of novelty which characterize my invention are pointed out with particularity in the claims annexed to and forming a part of this specification. For a better understanding of my invention, however, its advantages and specific objects obtained with its use, reference should be had to the accompanying drawings and descriptive matter in which I have illustrated and described preferred embodiments of my invention.

Fig. 1 is a diagrammatic representation of meter with parts broken away and in section;

Fig. 2 is a plan of a small portion of the apparatus shown in Fig. 1;

Fig. 3 is a view taken at right angles to Fig. 2;

Fig. 4 is an elevation of a larger portion of the apparatus shown in Fig. 1;

Fig. 5 is a fragmentary elevation taken similarly to Fig. 1 but on a larger scale; and Fig. 6 is a view taken similarly to Fig. 5 illustrating a modified construction.

In the drawings, I have illustrated an embodiment of the invention in an instrument comprising a recording arm F and an integrating control arm H, both carried by a rock shaft B, the angular position of the latter varying with changes in the instantaneous value of the quantity metered. The recording arm F makes a continuous record $K^5$ of the value of said quantity on a record chart K rotated at constant speed by a shaft K'. The varying angular positions of the arm H during any given period of time, determine the aggregate rotative movements imparted during the period to a disc U, which actuates or controls the actuation of an integrator counting train I. In accordance with the present invention a recording pen $f$ is actuated by the integrating mechanism to make record marks $K^6$ and $K^7$ on the chart K, showing the changes in the integrated value of the quantity measured occurring during any portion of the period of time covered by the record $K^5$.

Except for the pen $f$ and its operating connections, the instrument shown is of the character disclosed in my prior application Serial No. 78,148, filed December 29, 1925, the rock shaft B being connected to a magnetic core D moved axially of a pair of end to end coils C as the relative strengths of the electric currents flowing through the two coils are varied. In my said prior application the coils C and C are connected in an impedance bridge by which the core D is moved in correspondence with changes in the sealing liquid level in a manometer chamber but such impedance bridge need not be described herein, as the present invention does not depend on what quantity is measured, or what means are employed for causing adjustments of the rock shaft in response to changes in the value of said quantity. The core D is connected to the rock shaft by lever, link, and crank arm connections including a bell crank, a lever E, and a counterweight E' for balancing this portion of the mechanism against the action of gravity. The recorder arm F, and, as shown, an indicating arm G, are adjustably secured to the rock shaft B through an arm B' bent about a plate J back of the record chart K.

The shaft K' is rotated at a constant speed through gearing (not shown) by a timing motor L, which may well be a synchronous electric motor. The integrating mechanism includes a shaft M which is constantly rotated, as by the motor L, but at a very much higher angular velocity than the shaft K'. For example, the shaft K' may well make one revolution in 12 hours or in 24 hours, while the shaft M may make one revolution in one minute or so. Except when the shaft B is in its zero position, the roll U is brought into frictional contact with the periphery of the crank disc M' once during each revolution of the shaft M for a time period depending on the then position of the integrator control arm H, so as to give a corresponding angular movement to a shaft W to which is secured a gear W' driven by a worm U' carried by the shaft of the roll U.

The means for bringing the roll U into and out of engagement with the disc M' comprise, a pivoted support T for the roll U, a lever P oscillated by the shaft M, to turn about a pivot O, shown in Fig. 4, and a tripping part Q pivotally connected to the instrument frame work by the same pivot O, and a latch member R pivotally connected at P' to the lever P, and interlocked with the part Q and thereby held in rigid relation with the lever P at the beginning of each down stroke of the latter. While so interlocked the part R so engages the support T that the roll U is well out of contact with the disc M', but when the offset end Q' of the tripping part Q engages the arm H, the latch member R is released and the roll U drops into engagement with the disc M'. The support T is connected to the instrument frame work at one end by a pivot O', and is connected at its other end to the latch member R by a pin and slot connection including a pin R' carried by the member R and located in proximity to the supporting pivot O for the lever P. The lever P is oscillated by a link connection to a crank pin M² carried by the disc M'. At the end of each up stroke of the lever P, the latter engages an extension T' on the support T and thereby lifts the member R through their pin and slot connection, into the position in which the end of the member R abuts against the shoulder Q² and rests on the hook portion Q³, the tripping part Q, as shown in Fig. 1, thereby again interlocking.

As shown, the disc M' has a portion of its periphery cut away as indicated at $m$, so that the roll U will pass out of operative engagement with the disc M' at the end $m'$ of the cutaway portion $m$ prior to the re-locking of the roll U in its elevated position. In consequence the disc M' will cease to drive the roll U at the same point in each revolution of the disc regardless of any irregularity or lost motion in the mechanism by which the support T is relatched in its elevated positon.

In the construction shown in Figs. 1 to 5, a worm U' on the shaft of the roll U drives a gear W' on a shaft W. The latter controls the actuation of the counting train I, and the operation of the recording arm $f$ by a constantly rotating power driven shaft X. Secured to the latter is a ratchet wheel X' alongside which a cam Y is loosely mounted on the shaft X. Pivotally mounted on the cam Y is a pawl Y'. A spring Y² tends at all times to move the pawl Y' into engagement with the teeth of the wheel X'. During a portion of each revolution of the shaft W, the pawl Y' is held out of engagement with the wheel X' by the engagement of a pin Y³, carried by the pawl, with the side of a disc W² secured to the shaft W. The disc W² is formed with a notch W³ at its periphery through which the pin Y³ is moved by the spring Y² when the disc W² is rotated into a position permitting this. As soon as the pin Y³ passes through the notch W³ and out of engagement with the disc W², the pawl Y' engages the ratchet wheel X', and the cam Y is then given one complete turn which is quickly completed, as the shaft X rotates with an angular speed much higher than the normal speed of the shaft W.

The cam Y as shown is of scroll outline, with its high and low part connected by a shoulder Y⁴. Resting on the periphery of the cam Y is a projection I² from the lever I³ pivoted at I⁴ and connected by a link I' to the actuating arm I⁵ of the counting train I. A spring I⁶ connected with the arm I⁵ supplements the action of gravity in pulling the lever I³ downward when the rotation of the cam Y moves its high point past the projection I². Advantageously the shoulder Y⁴ is so shaped that as the lever I³ moves downward, the projection I² will give a small rapid final angular movement to cam Y, which forces the pawl pin Y³ against the side of the disc W² and causes the pawl to release the ratchet wheel X'.

The lever $I^8$ actuates the integrated value recording arm $f$ by oscillating a pawl lever $Z'$, once for each rotation of the cam Y. Each oscillatory stroke of the pawl lever $Z'$ angularly advances a ratchet wheel Z through a small angle corresponding to the angular difference between the teeth of the ratchet wheel Z. The recording arm $f$ is pivoted at $f'$, and is provided with a counterweight $f^2$ holding an arm $f^3$ connected to the arm $f$ against the periphery of the ratchet wheel Z. In consequence, on each angular advancement of the ratchet wheel Z by the lever $Z'$, the arm $f^3$ moves from the bottom of one tooth notch to the bottom of the following tooth notch, and in doing so rides up, and is rotated by the inclined front edge of the tooth between the two notches.

As shown, the ratchet wheel Z is formed with ten equally spaced teeth, nine of which teeth $Z^2$ are all alike, while the tenth tooth $Z^3$ is radially shorter than the others. The teeth notches are all alike, except that the notch in front of the tooth $Z^3$ is deeper than the others, and the back wall is cut away to form a shoulder $Z^4$, at the same distance from the axis of the wheel Z as the bottoms of the other teeth notches. In consequence, as the rotation of the wheel Z moves the arm $f^3$ up the inclined front side of each tooth $Z^2$, and then over the tip of the latter, the arm $f$ makes a corresponding radial line $K^6$ on the record chart K. The lines $K^6$ all extend radially outward from a marginal line $K^3$ printed on the chart. When, once in each revolution of the wheel Z, the latter is moved through the position shown in Fig. 5, the arm $f^3$ first drops off of the shoulder $Z^4$, and then rides up and over the tooth $Z^3$, the line $K^7$ then made by the arm $f$, extends inwardly from the line $K^3$, and also outwardly from the latter but not as far outwardly as the lines $K^6$ extend. The separation of the marks $K^6$ into groups separated by lines $K^7$ facilitates the rapid counting of the increments in the integrated value of the quantity measured, between any two points along the length of the instantaneous value curve $K^5$. Preferably, and as shown, the arm $f$ is in engagement with the line $K^3$ at any instant, at a point which bears the same relation to the time indicating lines $K^4$ printed on the chart, as does the point at which the recording arm F is in engagement with the chart at the same instant.

A record of the changes in the integrated value of the quantity measured, on the same chart as the continuous record $K^5$ of the instantaneous value of the quantity is of much practical value, as will be readily apparent to those skilled in the art. The integrated value record permits of a quick determination, by the attendant or by the plant management, of the total integrated value of the quantity measured during any portion of the time period covered by the instantaneous record $K^5$. Another advantage of the invention arises from the fact that ordinarily it is desirable to note on each chart the then readings of the integrator train I at the times the chart is inserted and removed from the meter. In case the attendant fails from any cause to make such notation at the proper time, his error can readily be corrected subsequently, by counting the integrator record marks along the line $K^3$, and deducting or adding them to the reading then shown by the train I, or noted upon a preceding or succeeding recorder chart.

It will be apparent, of course, that very different mechanisms may be provided for making a record on the record chart of the integrated values of the quantity measured. A mechanism different from that shown by Figs. 1 to 5, and giving advantageous results not obtainable with the mechanism shown by those figures, is shown in Fig. 6. In the last mentioned figure, the shaft of the roll U carries a spur gear $U^2$ in mesh with a spur gear $Z^5$, carried by a shaft to which is also secured a ratchet wheel ZA. The wheel ZA is formed with ten similar teeth $Z^2$ separated by teeth notches which are all alike, except that one of said notches is provided with a deep narrow extension $Z^{11}$ inward towards the axis of the gear ZA. While the rotation of the roll U and the rotation of the gear ZA are in intermittent steps, the time intervals between successive movements of the ratchet wheel ZA are so short in comparison with the time required for any appreciable angular movement of the record chart, that the portion of the line $K^8$ traced by the arm $f$ while the arm $f^3$ is riding up the front side of any tooth $Z^2$ will ordinarily appear on the chart as a smooth continuous line extending in a general diagonal direction between inner and outer circles $K^{10}$ and $K^{15}$ printed on the chart. In consequence the record line $K^8$ traced by the arm $f$ will be a zigzag line or series of inclined steps divided into successive groups of 10 each, by lines $K^9$ extending radially inward from the line $K^{10}$. A line $K^9$ is formed whenever the arm $f^3$ moves to the bottom of the slot $Z^{11}$. In Fig. 6 the line $K^9$ about to be formed after a further slight movement of the wheel ZA, is dotted in place. By drawing a number of circles $K^{11}$, equally spaced apart between the circles $K^{10}$ and $K^{15}$, a sort of vernier reading of the integrated value shown by the record line $K^8$ at any instant of time is readily obtainable.

In Fig. 6 the integrator counting train I is actuated by the arm $f^3$, through a lever $I^8$ pivoted at $I^7$, and having one end pressed against the arm $f^3$ by the pull of a weight $I^{10}$ carried by the link $I'$ connecting the second arm of the lever $I^8$ to the actuating arm of the counting train I.

While in accordance with the provisions of the statutes I have illustrated and described the best forms of my invention now known to me, it will be apparent to those skilled in the art that changes may be made in the form of the apparatus illustrated herein, without departing from the spirit of my invention as set forth in the appended claim, and that certain features of the invention may sometimes be used to advantages without a corresponding use of other features.

Having now described my invention, what I claim as new and desire to secure by Letters Patent, is:

In a measuring instrument the combination of a member movable in response to variations in the instantaneous value of the quantity measured, a revoluble member, record surface advancing means, means for imparting proportional movements to said revoluble member and record surface advancing means, an integrating mechanism including means adjusted by the movements of the first mentioned member for selective actuation by said revoluble member, and means actuated by said integrating mechanism for recording the actuations of the latter on said surface.

Signed at Philadelphia, in the county of Philadelphia, and State of Pennsylvania, this 12th day of August, A. D. 1926.

THOMAS R. HARRISON.